United States Patent Office 3,259,393
Patented July 5, 1966

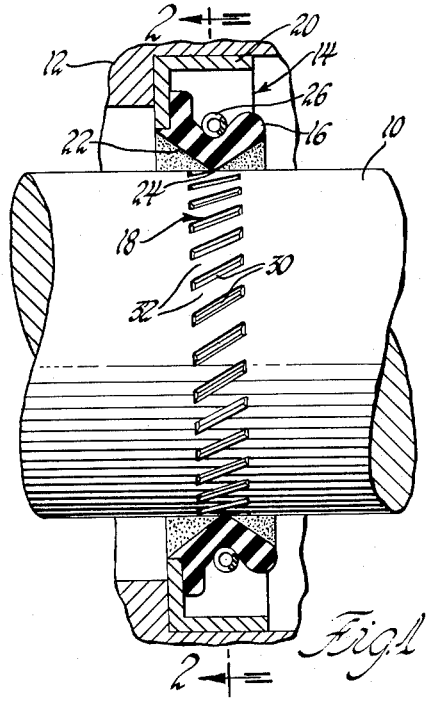
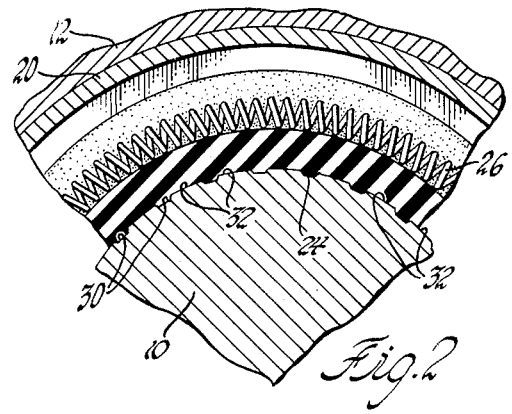
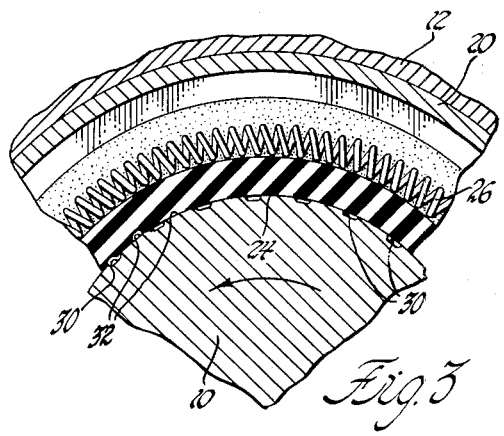
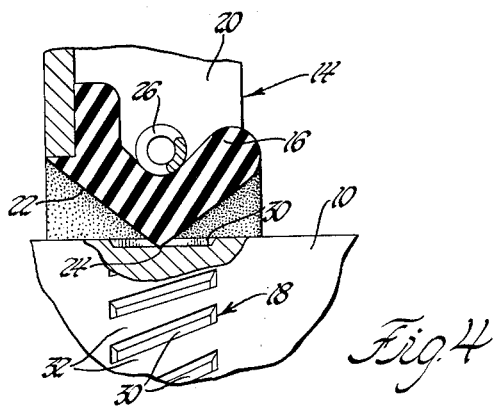
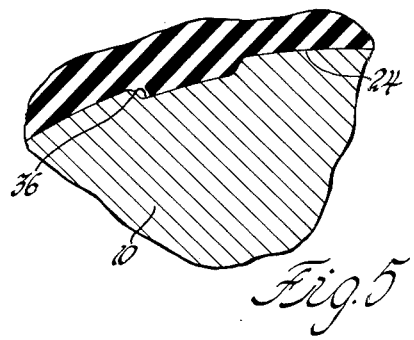
INVENTOR.
Robert L. Dega
BY
ATTORNEY

3,259,393
LIP SEAL FOR ROTARY SHAFT WITH PATTERNED GROOVES
Robert L. Dega, Utica, Mich., assignor to General Motors Corporation, Detroit, Mich., a corporation of Delaware
Continuation of application Ser. No. 260,144, Feb. 21, 1963. This application Sept. 2, 1964, Ser. No. 395,643
8 Claims. (Cl. 277—134)

This application is a continuation of copending application Serial Number 260,144, filed February 21, 1963.

This invention relates to shaft seals of the flexible lip type, and more particularly to a radial lip seal which coacts with patterned grooves on the shaft surface to effect a sealing relationship with the shaft.

It has been found that shaft surface properties such as surface finish, machining lead, and microscopic cracks seriously affect the dynamic and static sealing quality of lip seals. Of course, being elastic and somewhat flexible, the lip of the seal will tolerate varying degrees of such imperfections provided that the shaft speed is not too high or the temperature so low as to stiffen the lip. Attempts have been made to reduce the effect of shaft variables by better quality control and improved manufacturing techniques, but in spite of this, production handling of the shaft before assembly of the seal often produces small surface scratches which cause leaking.

One of the shaft variables contributing to the running quality of shaft seals is the shaft machining lead, i.e., the minute helical grooves formed on the surface of the shaft during finishing, usually by a centerless grinding operation. When deep enough, these grooves carry oil under the seal lip in the fashion of a screw. In addition, the grooves tend to abrade the lip as would a rough finished shaft surface. By reversing the direction of shaft rotation the leakage from this cause may be stopped, though abrading continues.

In the present invention, instead of a fully spiraled groove on a unidirectional shaft acting like a screw with the accompanying abrasive action, a pattern of short helical grooves is provided on the shaft surface beneath the lip. The pattern may have a left-handed spiral on a counterclockwise rotating shaft, or a right-handed spiral on a clockwise rotating shaft when viewed from the oil side of the lip and in either case, the individual grooves in the pattern move crosswise to the direction of oil movement pushing it back away from the lip, somewhat like the action of a snow plow. I have found that the groove spacing, size, shape, and position with respect to the seal lip are of critical importance.

Accordingly, it is the purpose of this invention to reduce the effect of shaft surface variables on the dynamic sealing quality of lip seals; to provide a controlled groove pattern on the shaft surface designed to cooperate with a seal lip when the shaft is running as well as when it is at rest to effect a fluid tight seal; and to provide a lip seal running surface on the shaft substantially free from any abrading action.

This invention is accomplished in a fluid sealing installation comprising, an elastomeric sealing element of the type used for sealing between a shaft and a housing and having a lip portion engageable with the shaft; a pattern of spaced helical grooves formed on the shaft circumjacent the lip portion, the pattern being spiraled in the direction of shaft rotation when viewed from the oil side of the lip and of a controlled dimension and spacing whereby the elastic lip portion deforms locally into each groove when the shaft is at rest and bridges the grooves riding on the lands when the shaft is rotating.

In the drawings:

FIGURE 1 is a side view of the seal installation showing the lip seal in cross-section and the shaft at rest;

FIGURE 2 is a view taken along line 2—2 of FIGURE 1;

FIGURE 3 is the same as the view shown in FIGURE 2 except that the seal and pattern groove relationship is illustrated with the shaft running;

FIGURE 4 is a partial view of the upper part of the seal installation of FIGURE 1; and FIGURE 5 is an enlarged partial view showing the relationship of the seal and a single groove taken along the line 5—5 of FIGURE 4 with the shaft at rest.

Referring to the drawings, the shaft 10 is journaled in the housing 12 and it is assumed that the bearing for the shaft is to the right of the seal installation 14 as seen in FIGURE 1 and is of the type supplied with an oil or other fluid lubricant sometimes hereinafter referred to as the sealant.

The seal installation 14 includes a lip seal 16 mounted in the housing 12 and a helical groove pattern 18 formed on the unidirectional shaft 10.

In more detail, lip seal 16 includes an annular casing 20 to which is bonded or otherwise secured, an elastomeric sealing element 22 having a radial lip portion 24 engageable with the shaft 10 and biased inwardly by a continuously coiled spring 26 surrounding the lip. Lip seals of this general design are common. The seal installation 14 also includes the circumferential groove pattern or band 18 circumjacent the lip 24 formed by the alternate series of grooves 30 and lands 32. The grooves may be machined, rolled, or etched in the surface of shaft 10 at almost any angle with the shaft axis, but a slope of about 45 degrees has been found most satisfactory and permits wider groove spacing. Since the seal lip locally deforms into each groove when the shaft stops, as seen in FIGURE 2, the groove spacing relative to the groove width and depth is a critical factor and grooves of a uniform width and depth are important to the formation of the inventive pattern. The lip 24 engages the pattern roughly at a central location, but at least back from the edge of the pattern on the sealant side by $\frac{1}{16}$ to $\frac{1}{4}$ of an inch, and since the axial location of the lip is variable within $\frac{1}{8}$ of an inch, due to manufacture and assembly tolerances, it is desirable to make the groove pattern wide enough to assure that the seal lip is properly located with the pattern after assembly. In terms of a screw thread, the helical groove pattern shown is left-handed, and the shaft must therefore rotate in a counterclockwise direction viewed from the oil side of the seal as depicted by the arrow in FIGURE 3. If the intended shaft rotation is in the opposite direction, the groove pattern must be of a right-handed nature.

The groove pattern 18 must have a particular ratio of groove to land dimension in order to accommodate the deformation to the lip. The lands 32 between adjacent grooves 30 are from 5 to 10 times the groove width. For example, with a groove width in the order of 0.03 inch, the land width will be in the order of 0.15 to 0.3 inch.

In practice, the groove width may vary between 0.03 and 0.06 inch. A groove width in excess of 0.06 inch would be detrimental from the standpoint of permitting the lip to partially conform to the unsupported area of the grooves when the shaft is rotating, thus causing sheer forces to act on the rubber as it is pushed back to shaft diameter. A groove width of less than 0.03 inch is detrimental because that would not allow the lip to deform into the grooves when the shaft is stopped unless an extremely soft elastomer were chosen or higher spring forces were used. It is necessary to keep the grooves relatively shallow, and a depth of from 0.1 to 0.4 mil has proved satisfactory; this means that the groove width is about 100 times greater than the groove depth. As seen in FIGURE 5, the grooves have sloping longitudinal side walls 36 to provide a smooth change in elevation between the bottom of the grooves and the top of the lands thereby assuring that each groove of the pattern is completely sealed. This feature also minimizes wear on the lip by reducing torsional friction when the shaft is in motion and lessening starting torques.

With the shaft rotating, as shown in FIGURE 3, the lip 24 is held back to shaft diameter out of the grooves and is only running in sealing contact with the lands 32. Nevertheless, total sealing is accomplished through the combined efforts of the lip sealing on the lands and the "snow plow" effect of the grooves. As oil approaches the sealing zone, it will encounter the rotating pattern 18 and the seal lip 24. Any oil finding its way into the grooves 30 will be thrown back away from the lip 24 by the repelling effect of the inclined groove pattern. The groove pattern travels crosswise to the direction of oil movement and is most effective when the pattern extends approximately ⅛ inch past the seal lip on the oil side and is inclined at about 45 degrees. The repelling force is therefore a function of the shaft speed and groove angle. This effect is greater at higher speeds which compensates for the greater tendency of oil to leak at these speeds due to the thinning of it by the higher operating temperatures. A normal sealing relationship is maintained between the lip 24 and the land areas 32 by virtue of the radial pressure exerted on the lip by spring 26, but the spring pressure is not so great as to cause local deformation of the lip into the grooves under dynamic conditions.

Heretofore, shaft surface imperfections have contributed to the lack of sealing quality in lip seals both under dynamic and static conditions. Surface cracks running longitudinally through the sealing zone form minute canals for conveying oil beyond the seal. Machining lead is another factor causing seal wear and leakage. As the temperature of operation increases, the oil becomes thinner and is more easily lost due to these shaft imperfections. In some cases, because the lip is flexible, it will tolerate varying degrees of these factors provided the shaft speed is not too high or the temperature so low as to stiffen the lip. Since it is to be expected that the operating temperatures of these seals will range from a low of below freezing to a high of around 250° centigrade, I have chosen a rubber hardness in the order of 70 durometers for most applications, but clearly other prevailing factors may suggest that a softer or harder material be used. In any case, the elastomeric material is chosen sufficiently flexible to deform locally to seal with the groove pattern 18 when the shaft is stopped.

It is clear from the foregoing that shaft surface imperfections, such as shallow longitudinal cracks or machining lead will be disrupted by the groove pattern 18 and will have little or no effect on the dynamic or static sealing quality of the lip seal. Under static conditions, for example, a shallow axial surface crack interrupted by one of the helical grooves would have no tendency to cause leaking beyond the lip because the leakage path would be blocked by the lip that has locally extruded to close the groove.

While the invention has been described by reference to the embodiments shown herein, it is not intended that certain details thereof should limit the scope of the invention, and obvious modifications will fall within the scope of the appended claims except insofar as limited by the prior art.

I claim:

1. A fluid seal for sealing between two relatively rotating concentric members comprising, an elastomeric sealing annulus mounted on one of the members and having a flexible lip portion engageable with a surface of the other member and a plurality of spaced helical grooves in said surface of the other member, said grooves being spiraled in the direction of shaft rotation as viewed from the sealing side of the seal and having width and depth in the order of 0.03 to 0.06 inch and 0.0001 to 0.0004 inch respectively with spacing between adjacent grooves at least 5 times the groove width, said flexible lip portion being locally deformed into each groove when the members are rotating relative to each other and bridging said grooves when said members are rotating relative to each other.

2. A fluid seal for sealing between two relatively rotatable concentric members comprising, an elastomeric sealing annulus mounted on one of the members and having a flexible lip portion engageable with the surface of the other member and a plurality of spaced helical grooves in said surface of the other member, said grooves being spiraled in a direction of shaft rotation as viewed from the sealing side of the seal and having the space between adjacent grooves in the order of 5 to 10 times the width of each groove which in turn is in the order of 100 times greater than the groove depth, said flexible lip portion being locally deformed into each groove when the members are stationary relative to each other and bridging said grooves when said members are rotating relative to each other.

3. A fluid sealing installation for sealing between two relatively rotating concentric members comprising, an elastomeric sealing annulus mounted on one of the members and having a radially biased flexible lip portion engageable with the other member, and a pattern of spaced helical grooves formed on the other member circumjacent the lip portion, said groove pattern being spiraled in the direction of shaft rotation as viewed from the sealant side and of a controlled dimension wherein the space between adjacent grooves is in the order of 5 to 10 times the groove width of not less than 0.03 inch which in turn is in the order of 100 times greater than the groove depth whereby the elastomeric lip portion is locally deformed into each groove when the shaft is at rest and bridges the grooves when the shaft is rotating.

4. A fluid sealing installation for sealing between a housing and a shaft journaled therein, an elastomeric sealing annulus received over the shaft and mounted to the housing having a radially biased flexible lip portion engageable with the shaft, and a pattern of spaced helical grooves formed on the shaft circumjacent the flexible lip portion, said groove pattern being spiraled in the direction of shaft rotation as viewed from the sealant side and of a controlled dimension wherein the space between adjacent grooves is in the order of 0.15 to 0.3 inch and the groove width and depth is in the order of 0.03 inch and 0.0004 inch respectively whereby the elastomeric lip portion is locally deformed into each groove when the shaft is at rest and bridges the grooves when the shaft is rotating.

5. The fluid sealing installation according to claim 3 wherein said groove pattern extends in an axial direction beyond the circle of engagement of the flexible lip portion by a distance in the order of ⅟₁₆ to ¼ inch on the sealant side of the lip.

6. The fluid sealing installation according to claim 3 wherein the grooves in said pattern have sloping longitudinal side walls.

7. A fluid sealing installation for sealing between two relatively rotating concentric members comprising, an elastomeric sealing annulus mounted on one of the members and having a radially biased flexible lip portion engageable with the other member, and a pattern of spaced helical grooves formed on the other member circumjacent the lip portion, said groove pattern being spiraled in the direction of shaft rotation as viewed from the sealant side and of a controlled dimension wherein the space between adjacent grooves is in the order of 5 to 10 times the groove width ranging between 0.03 and 0.06 inch which in turn is in the order of 100 times greater than the groove depth whereby the elastic lip portion is locally deformed into each groove when the shaft is at rest and bridges the grooves when the shaft is rotating.

8. The fluid sealing installation according to claim 7 wherein the grooves in said groove pattern are inclined in the order of 45 degrees to the axis of rotation.

References Cited by the Examiner

UNITED STATES PATENTS 2,860,896   11/1958   Naumann _____ 277—134

SAMUEL ROTHBERG, *Primary Examiner.*

LAVERNE D. GEIGER, *Examiner.*